United States Patent [19]

Kuwahara

[11] Patent Number: 5,154,623
[45] Date of Patent: Oct. 13, 1992

[54] EDDY CURRENT TYPE BRAKE SYSTEM

[75] Inventor: Touru Kuwahara, Kawasaki, Japan

[73] Assignee: Isuzu Motors Limited, Tokyo, Japan

[21] Appl. No.: 574,829

[22] Filed: Aug. 29, 1990

[30] Foreign Application Priority Data

Aug. 30, 1989 [JP] Japan .................. 1-221555

[51] Int. Cl.⁵ .............................................. B60L 7/28
[52] U.S. Cl. .................... 188/164; 310/105
[58] Field of Search ............. 188/158, 155, 164, 159, 188/160; 310/105, 76, 77, 93

[56] References Cited

U.S. PATENT DOCUMENTS

| | | | |
|---|---|---|---|
| 1,968,583 | 7/1934 | Apple | 188/164 |
| 2,690,819 | 10/1954 | Meyer | 188/164 |
| 3,625,318 | 12/1971 | Wymann | 188/164 |
| 3,837,442 | 9/1974 | Baermann | 188/159 |
| 4,013,241 | 3/1977 | Gray | 192/84 PM X |
| 4,128,147 | 12/1978 | Rubertc | 188/164 |
| 4,668,886 | 5/1987 | Marandet et al. | 188/164 X |
| 4,685,202 | 8/1987 | Booth et al. | 188/161 X |
| 4,853,573 | 8/1989 | Wolcott et al. | 310/105 |
| 4,938,327 | 7/1990 | Tominaga | 192/84 C X |
| 5,023,499 | 6/1991 | Kuwahara | 188/164 X |

FOREIGN PATENT DOCUMENTS

0077702 4/1983 European Pat. Off.
274358 11/1988 Japan.

Primary Examiner—Robert J. Oberleitner
Assistant Examiner—Peter M. Poon
Attorney, Agent, or Firm—Dykema Gossett

[57] ABSTRACT

An eddy current type brake system connected to an output shaft of a transmission of a vehicle comprises a rotor connected to the transmission shaft, a stator movable relative to the rotor and a magnet mounted on the stator. The rotor has a ferromagnetic part and a non-magnetic or feeble-magnetic part. The magnet of the stator can move into the vicinity of the ferromagnetic part of the rotor to allow an eddy current to flow in the rotor. The magnet also can move into the vicinity of the non-magnetic or feeble-magnetic part of the rotor to prevent the eddy current from reaching the rotor. Therefore, when the magnet is moved into the vicinity of the ferromagnetic part, a brake force is applied to the rotor due to the eddy current whereas when the magnet is moved into the vicinity of the non-magnetic or feeble-magnetic part, the brake force is no longer applied to the rotor.

14 Claims, 4 Drawing Sheets

EDDY CURRENT TYPE BRAKE SYSTEM

BACKGROUND OF THE INVENTION

1. Technical Field

The present invention relates to an eddy current type brake system adapted for a vehicle, and more particularly to an eddy current type brake system which produces eddy current in a rotor by use of permanent magnets.

2. Background Art

An eddy current type brake system is known as a vehicle retarder ensuring stable continuous braking in combination with a main brake (foot brake) and preventing burning of the main brake.

The eddy current type brake system generally includes a rotor mounted on a shaft, such as a propeller shaft, drivingly connected to wheels of a vehicle and a magnetic power source, such as an electro-magnet or a permanent magnet, mounted on a fixed portion, such as a frame of the vehicle, so as to be located near the rotor. The eddy current is produced in the rotor due to a relative velocity difference between the rotor (a rotary portion) and the magnetic power source (the stationary portion). The eddy current serves as the brake force against the rotation of the rotor, whereby the vehicle is decelerated.

In order to design a compact, light weight eddy current type retarder, a compact permanent magnet which possesses very strong magnetism may be employed as the magnetic power source.

FIG. 6 of the accompanying drawings shows an eddy current type retarder which uses permanent magnets as the magnetic power source. This arrangement was developed by the assignee of the present application. A rotor (b) of the eddy current type retarder is mounted on an output shaft (a) of a transmission of a vehicle. The rotor (b) is made from conductive, ferrogmagnetic material and shaped like a drum having a bottom. The rotor (b) extends coaxially with the output shaft (a). A stator (d) is supported by a transmission casing (c) and positioned inside the rotor (b) in a manner such that the stator (d) can move reciprocatively in the axial direction of the rotor (b). The stator (d) includes a support ring (e) and permanent magnets (f). The support ring (e) is shaped to be annular and coaxial with the output shaft (a). The permanent magnets (f) are mounted on the support ring (e). The stator (d) is mounted on the transmission casing (c) with a mounting element (g). The permanent magnet (f) is made from rare earth meatal such as neodymium, light in weight and compact in size. The magnets (f) are arranged in a circle to face the inner wall of the rotor (b), with the pole (S or N) of one magnet being opposite the opposite pole (N or S) or a next magnet in the circumferential direction of the rotor (b). The number of the magnets (f) is an even number such as eight, ten or twelve. The stator (d) includes permanent magnets (f) and the support ring (e) and sealingly housed in a casing (h). The stator (d) moves reciprocatively in the casing (h). The casing (h) includes a brake member (i) and a brake releasing part (j). The brake member (i) and the brake releasing member (j) extend between the rotor (b) and the stator (d). The brake member (i) magnetically connects the permanent magnets (f) of the stator (d) with the rotor (b) so as to apply the brake force to the rotor (b). The brake releasing member (j) disconnects the magnetic connection between the magnets (f) and the rotor (b) by preventing the magnetic flux of the magnets (f) from reaching the rotor (b).

Referring to FIG. 7, the brake member (i) includes a ferromagnetic element (oblique lines) and a non-magnetic element (dots). That part (k) of the permanent magnet (f) which faces the rotor (b) (called "pole piece") is made from the feromagnetic material having a large magnetic permeability and another part is made from non-magnetic material having a small magnetic permeability. The pole pieces (k), in order to magnetically connect the permanent magnets (f) with the rotor (b), are arranged with the same intervals as the permanent magnets (f) and in the same direction as the permanent magnets (f) so that one pole piece (k) makes a pair with one permanent magnet (f). The brake releasing member (j) is made from ferromagnetic material to magnetically directly connect one pole (N) of a magnet with a pole (S) of a next magnet.

When the brake force is applied to the vehicle by the eddy current type retarder having the construction described above, the stator (d) is moved under the brake member (i) by an actuator (1) as indicated by the solid line in FIG. 6. In other words, the stator (d) is moved to the right in the drawing. Since the pole pices (k), the rotor (b) and the support ring (e) are made from ferromagnetic material, a magnetic circuit is made between each two adjacent magnets, namely the magnet circuit extending from the N pole of one magnet (f), the brake member (i), the rotor (b), the brake member (i), the S pole of a next magnet (f), the stator (d) and the N pole of the just-mentioned next magnet (f) and the S pole of the above-mentioned one magnet (f). Thereupon, the eddy current flows through the magnetic circuit and the brake force is applied to the rotor, whereby the output shaft of the transmission is decelerated and then the vehicle is decelerated.

When the brake of the eddy current type retarder is released from the rotor, the stator (d) is moved under the brake releasing member (j), as indicatd by the dashed line in FIG. 6. In other words, the stator (d) is moved to the left in the drawing. Under the brake releasing member (j), another magnetic circuit is established. Specifically, this magnetic circuit dies not enter the rotor (b) so that the eddy current no longer flows in the rotor (b). Thus, no brake force is applied to the rotor (b). The magnetism of the permanent magnets (f) is stopped by the brake releasing member (j) and does not reach the rotor (b).

If the brake releasing member is designed to be relatively thin in order to reduce the total weight of the retarder, adequate stopage of the magnetism of the magnets (f) cannot be expected. Then, part of the magnetic flux leaks into the rotor (b) and the eddy current flows through the rotor (b). Thereupon, the brake force is applied to the rotor (b) even though the stator (d) is located under the brake releasing member (j).

The thickness of the brake releasing member (j) is designed thicker in order to assure adequate brake release. Then, the thickness of the brake member (j) has to be designed thicker if balance is to be maintained. This means that the thickness of the pole pieces will become thicker and that the resistance against the magnetic flux will become large. Therefore, a strong eddy current is not produced and a strong brake force is not produced. In addition, the weight of the retarder becomes large.

Another way to avoid an inadequate stopage of the magnetic flux at the brake releasing member is to reduce the width D of the rotor (b), i.e., to reduce the width D of the rotor (b) to the width (D1), as indicated by (m) in FIG. 6. In this case, the rotor (b) covers the brake member (i) only and does not cover the brake releasing member (j). With this arrangement, when the stator (d) is moved to the left in the drawing, the magnetic flux from the permanent magnets (f) penetrates the brake releasing member (j) and then leaks to the atmosphpere. This means that the eddy current does not flow in the rotor (b) when the stator (d) is under the brake releasing member (j) and that the brake force is no longer applied to the rotor (b) at that time.

However, the heat releasing surface area of the rotor (b) becomes small as the width of the rotor (b) is reduced. Therefore, the temperature of the rotor (b) having a width D1 becomes higher than that at the rotor (b) having a width D. The electrical resistance of the rotor (b) becomes larger as the temperature of the rotor (b) becomes higher. Accordingly, the eddy current becomes smaller and the brake force applied to the rotor (b) becomes smaller. In addition, deformation and/or crackign will occur in the rotor (b) due to the heat. The rotational balance of the rotor will be deteriorated upon deformation and/or the cracking of the rotor.

SUMMARY OF THE INVENTION

An object of the present invention is to provide a compact, light weight eddy current type brake system which does not allow the eddy current to reach the rotor when the stator is moved under the brake releasing member, without lowering the brake force to be applied to the rotor.

According to one aspect of the present inveniton, there is provided an eddy current type brake system characterized in that a rotor includes a ferromagnetic part and a feeble magnetic or non-magnetic part, that the rotor is connected to a shaft drivingly connected to an engine of a vehicle, that a stator has a permanent magnet and can move between the ferromagnetic part and the feeble or non-magnetic part, whereby a brake force is applied to the shaft by moving the permanent magnet near the feromagnetic part of the rotor. According to this arrangement, when the stator is moved under the ferromagnetic part, the eddy current is produced due to a relative velocity difference between the stator and the rotor. The eddy current produces the brake force against the shaft rotated by the engine. The brake force is not applied to the shaft when the stator is moved under the feeble or non-magnetic part since the eddy circuit is not produced in the feeble or non-magnetic part. The permanent magnet is employed as the magnetic power source so that the arrangement can be designed to be lighweight and compact in size.

DESCRIPTION OF THE PREFERRED EMBODIMENTS

Now, a preferred embodiment of the present invention will be explained with the attached drawings.

Figure 1:
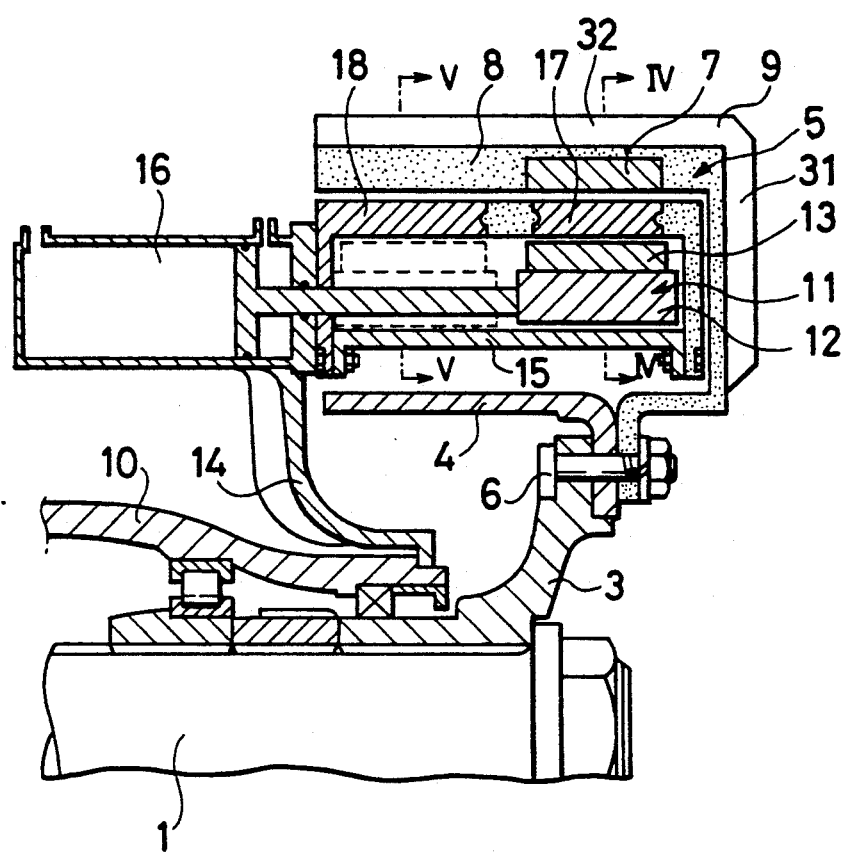
FIG. 1 is a sectional view showing an eddy current type brake system according to the present invention.

Referring to FIG. 1, a flange 3 is formed on an output shaft 1 of a transmission (not shown) of a vehicle (not shown). The flange 3 extends in the radial direction of the output shaft 1. A drum 4 for a parking brake and a rotor 5 for an eddy current type brake system are mounted on the flange 3 with a bolt 6.

The rotor 5 is shaped like a drum and has a lateral wall 32 and a bottom 31. The rotor 5 includes a ferromagnetic part 7 having a large magnetic permeability and a non-magnetic part 8 having a small magnetic permeability. Cooling fins 9 are formed on the outer surface of the rotor 5.

Figure 2:
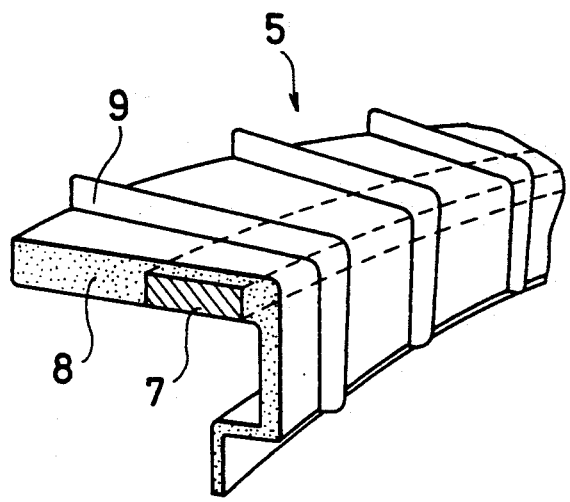
FIG. 2 is a partial perspective view of a rotor illustrated in FIG. 1.

The ferromagnetic part 7, as shown in FIG. 2, extends in the circumferential direction of the drum-like rotor 5 and faces the lateral wall 32 of the rotor 5 near the bottom 31 of the rotor 5. The non-magnetic part 8 also extends in the circumferential direction of the rotor 5 and faces the lateral wall 32 of the rotor 5 further from the bottom 31 of the rotor 5. The ferromagnetic part 7 and the non-magnetic part 8 extend in a mutual curved plane.

A stator 11 is supported by a casing 10 of the transmission and located in the rotor 5, as shown in FIG. 1. The stator 11 is movable in the right and left direction of the drawing. In other words, the stator 11 reciprocates between a ferromagnetic zone defined by the ferromagnetic part 7 and a non-magnetic zone defined by the non-magnetic part of the rotor 5.

The stator 11 includes a support ring 12 and permanent magnets 13 mounted on the support ring 12. The support ring 12 is shaped in an annular ring and coaxial with the output shaft 1. The stator 11 is mounted on the transmission casing 10 with a member 14. Each permanent magnet 13 is made from rare earth metal such as neodymium, and is lighweight and small in size. An even number, between eight and twelve, of permanent magnets are employed and arranged on the support ring 12 at predetermined intervals in a manner such that the pole (S or N) of one magnet 13 faces an opposite pole (N or S) of a next magnet 13. The stator 11 is sealingly housed in the casing 15 in a manner such that the stator 11 can move in the right and left direction in the drawing.

An actuator 16, such as an air cylinder device, is mounted on the casing 15. The stator 11 is reciprocatively moved by the actuator 16.

The casing 15 is disposed inside the rotor 5 with a predetermined clearance. The casing 15 includes a brake applying part or zone 17 and a brake releasing part or zone 18. The braking zone 17 is defined by the ferromagnetic member 7 of the rotor 5 and the brake releasing zone 18 is defined by the non-magnetic member 8 of the rotor 5. The braking zone 17 and the brake releasing zone 18 extend between the rotor 5 and the stator 1. The braking zone 17 faces the ferromagnetic member 7 of the rotor 5 and the permanent magnet 13 of the stator 11 when the stator 11 is moved to the rightmost position in the casing 15, as indicated by the solid line in FIG. 1. In this case, the magnetic flux from the magnet 13 reaches the ferromagnetic member 7 and the brake force is applied to the rotor 5. The brake releasing zone 18 faces the non-magnetic member 8 of the rotor 5 and the permanent magnet 13 when the stator 11 is moved to the leftmost position in the casing 15 as indicated by the broken line in FIG. 1. In this case, the magnetic flux from the permanent magnet 13 does not reach the rotor 5 so that the brake force is no longer applied to the rotor 5.

Figure 3:
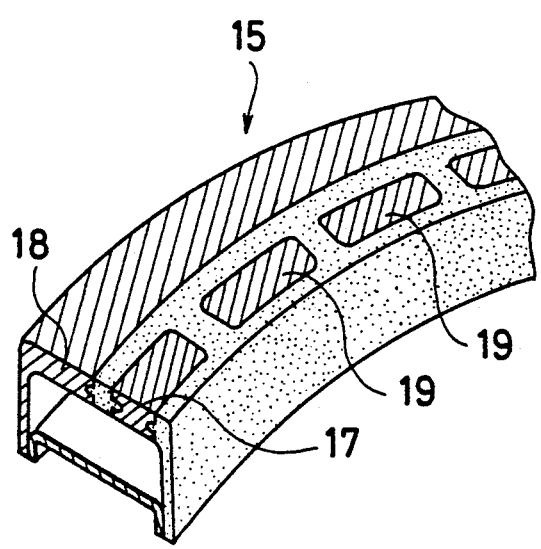
FIG. 3 is a parital perspective view of a casing of FIG. 1.

Referring to FIG. 3, the brake zone 17 includes a part (oblique lines) 19 made from ferromagnetic material and a part (dots) made from non-magnetic material. The part 19 is called a pole piece 19. The pole pieces 19 are arranged in the circumferential direction of the casing 15 with the same intervals as the permanent magnets 13 in a manner such that each pole piece 19 directly faces each permanent magnet 13 and makes a pair with the permanent magnet 13. The pole pieces 19 serve as magnetic passages between the permanent magnets 13 of the stator 11 and the ferromagnetic member 7 of the rotor 5.

On the other hand, the brake releasing zone 18 is a single element and extends continuously in the circumferential direction of the casing 15. The brake releasing zone 18 is entirely made from ferromagnetic material.

The operation of the eddy current type brake system will now be described.

Figure 4:
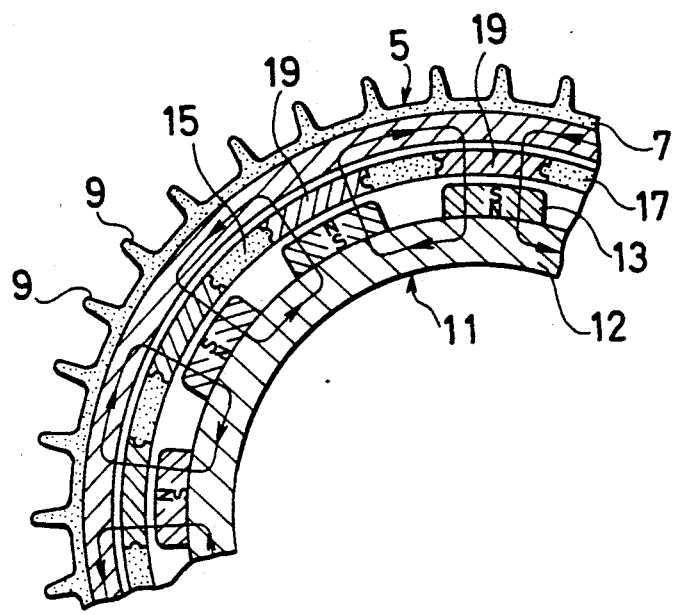
FIG. 4 is a view taken along the line IV—IV of FIG. 1.

The actuator 16 moves the stator 11 to the right in FIG. 1 when the brake force to the rotor 5 is necessary. Then, as shown in FIG. 4, the permanent magnets 13 of the stator 11 is magnetically connected to the ferromagnetic member 7 of the rotor 5 by the magnetic flux from the permanent magnet 13 which penetrates the brake member 17 (more specifically, the pole pieces 19) of the casing 15. Then, the eddy current flows through the ferromagnetic member 7 of the rotor 5 due to the relative velocity difference between the stator 11 and the rotor 5. Accordingly, the brake force due to the eddy current is applied to the output shaft 1. The magnetic circuit passes through the pole piece 19 and enters the rotor 5 because of the non-magnetic member. In other words, without the non-magnetic member, the magnetic circuit may not enter the rotor 5.

Figure 5:
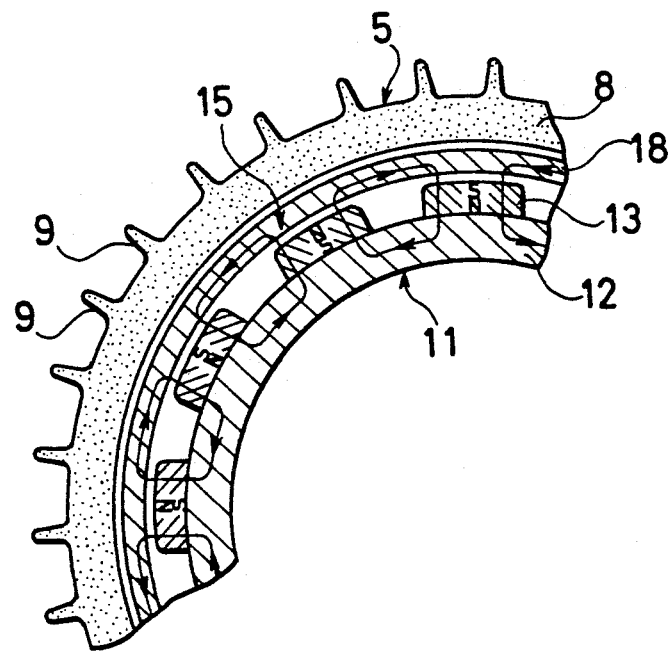
FIG. 5 is a view taken along the line V—V of FIG. 1.
Figure 6:
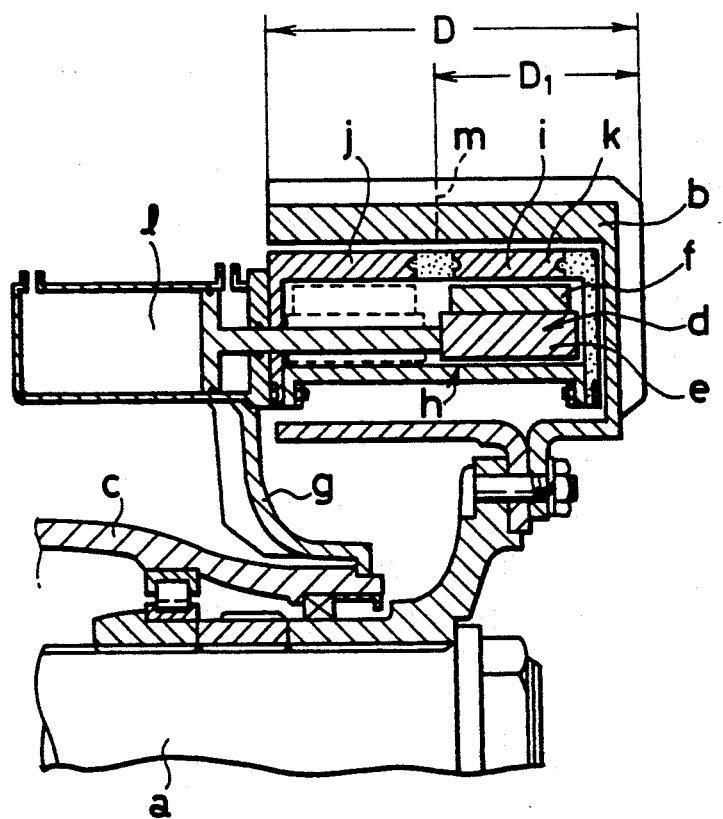
FIG. 6 shows a sectional view of an eddy current type brake system developed by the assignee of the present application prior to the present invention.
Figure 7:
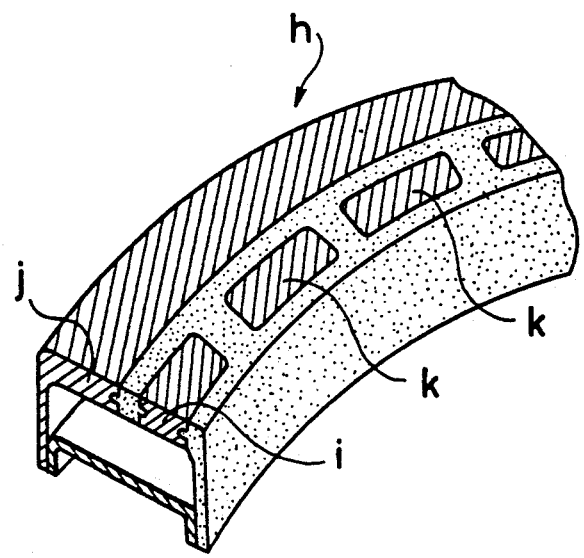
FIG. 7 shows a partial perspective view illustrating a casing of FIG. 6.

The brake force against the output shaft 1 is stopped as the stator 11 is moved to the left in FIG. 1 by the actuator 16 as indicated by the broken line. At this point, the stator 11 faces the non-magnetic part 8 of the rotor 5 via the magnet 13. In this case, as shown in FIG. 5, the magnetic flux from the magnets 13 do not penetrate the brake releasing part 18 of the casing 15, i.e., a magnetic shielding condition is established. The magnetic flux from one magnet 13 flows through the brake releasing part 18, an adjacent magnet 13 and the support ring 12 and returns to the same magnet 13.

If the magnetic flux from the permanent magnet 13 leaks to the rotor 5, that part (the non-magnetic part 8) of the rotor 5 which faces the brake releasing part 18 is made from non-magnetic material such as aluminium. Therefore, the eddy current is not produced in the part 8 and the brake force is not generated.

The brake releasing part 8 does not have to possess a strong magnetism shielding property. Therefore, the thickness of the brake releasing part 8 can be relatively thin. This reduces the total weight of the brake system.

The permanent magnets made from rare earth metal are employed as the magnetic power source, so that the brake system can be designed compact since the magnets 13 exhibit strong magnetism.

The non-magnetic member 8 of the rotor 5 may be replaced by feeble-magnetic member such as FC. In this case, a small amount of eddy current flows in the rotor 5 even when the magnet 13 comes under the brake releasing part 18 of the casing 15. However, the brake force due to this eddy current is negligibly small and raises no problem in an actual case.

We claim:

1. An eddy current type brake system adapted to a vehicle, the vehicle having a shaft rotating with an engine of the vehicle, comprising:

a drum-shaped rotor connected to the shaft and having a ferromagnetic part and a substantially non-magnetic part in turn in the axial direction of the shaft, the ferromagnetic part being fixed relative to the non-magnetic part;

a stator provided within the drum-shaped rotor and movable relative to the rotor;

permanent magnets mounted on the stator for producing an eddy current in a manner such that when the permanent magnets are moved in the vicinity of the ferromagnetic part of the rotor, the eddy current flowing in the rotor to apply a brake force to the rotor whereas when the permanent magnets are moved in the vicinity of the substantially non-magnetic part of the rotor, the eddy current is prevented from flowing in the rotor, the eddy current is prevented from flowing in the rotor and the brake force is not applied to the rotor; and, means for moving the stator into the vicinity of the ferromagnetic part and for maintaining the position of the stator when braking of the shaft is required, but operable for moving the stator into the vicinity of the substantially non-magnetic part and for maintaining the position of the stator when the brake on the shaft is released.

2. The brake system of claim 1, wherein the rotor has a circumferential direction and the permanent magnets are arranged on the stator along the circumferential direction of the rotor in a manner such that the polarity of one permanent magnet faces an opposite polarity of a next permanent magnet.

3. The brake system of claim 1, further including a casing for housing the stator and the stator can move to the vicinity of the ferromagnetic part of the rotor and to the vicinity of the non-magnetic part of the rotor within the casing.

4. The brake system of claim 3, wherein the casing includes a brake part which faces the ferromagnetic part of the rotor so that the magnetism of the permanent magnet of the stator is magnetically connected to the ferromagnetic part of the rotor.

5. The brake system of claim 4, wherein the casing further includes a brake releasing part which faces the essentially non-magnetic part of the rotor so that the magnetism of the permanent magnets of the stator is magnetically shielded within the casing.

6. The brake system of claim 3, wherein the casing the ferromagnetic parts which are spaced in the circumferential direction of the rotor and the ferromagnetic parts face the permanent magnets on the stator and also face the ferromagnetic part of the rotor, and other areas of the casing are formed from substantially non-magnetic parts.

7. The brake system of claim 3, wherein the casing further includes ferromagnetic parts which face the substantially non-magnetic part of the rotor and continuously extend in a circumferential direction of the rotor so that the magnetism of the permanent magnets of the stator is magnetically shielded within the casing.

8. The brake system of claim 1, wherein the shaft is an output shaft of a transmission of the vehicle.

9. The brake system of claim 1, wherein a drum for a parking brake is also mounted on the rotor.

10. The brake system of claim 1, wherein the ferromagnetic part is made from a material including rare earth metal.

11. The brake system of claim 10, wherein the rare earth metal includes neodymium.

12. The brake system of claim 1. wherein the drum-shaped rotor has a longitudinal direction, and the permanent magnets and the stator are located inside the rotor such that they move inside the hollow drum-shaped rotor in the longitudinal direction of the rotor.

13. The brake system of claim 1, further including an actuator for moving the stator.

14. The brake system of claim 13, wherein the actuator includes an air cylinder device.

* * * * *

UNITED STATES PATENT AND TRADEMARK OFFICE
CERTIFICATE OF CORRECTION

PATENT NO. : 5,154,623

DATED : October 13, 1992

INVENTOR(S) : Kuwahara

It is certified that error appears in the above-identified patent and that said Letters Patent is hereby corrected as shown below:

Column 6, line 56, "the" (2nd Occurrence) should read --has --.

Signed and Sealed this

Sixteenth Day of November, 1993

*Attest:*

BRUCE LEHMAN

*Attesting Officer*     *Commissioner of Patents and Trademarks*